US012617085B2

(12) United States Patent　　　　(10) Patent No.:　　US 12,617,085 B2
Luo et al.　　　　　　　　　　　　　(45) Date of Patent:　　　May 5, 2026

(54) METHOD FOR AVOIDING SINGULARITIES OF ROBOTIC ARM, CONTROL DEVICE AND COMPUTER-READABLE STORAGE MEDIUM

(71) Applicant: UBTECH ROBOTICS CORP LTD, Shenzhen (CN)

(72) Inventors: Xuan Luo, Shenzhen (CN); Chunyu Chen, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 192 days.

(21) Appl. No.: 18/395,610

(22) Filed: Dec. 24, 2023

(65) Prior Publication Data

US 2024/0217108 A1　　Jul. 4, 2024

(30) Foreign Application Priority Data

Dec. 29, 2022　　(CN) ........................ 202211712996.X

(51) Int. Cl.
B25J 9/16　　　　　(2006.01)
(52) U.S. Cl.
CPC ........... B25J 9/1633 (2013.01); B25J 9/1664 (2013.01); *B25J 9/1692* (2013.01); *G05B 2219/40354* (2013.01)
(58) Field of Classification Search
CPC ...... B25J 9/1692; B25J 9/1664; B25J 9/1633; G05B 2219/40354
See application file for complete search history.

(56) References Cited

U.S. PATENT DOCUMENTS

| | | | | |
|---|---|---|---|---|
| 4,893,254 | A | * | 1/1990 | Chan ...................... B25J 9/1607 |
| | | | | 700/263 |
| 5,499,320 | A | * | 3/1996 | Backes .................. B25J 9/1689 |
| | | | | 700/260 |
| 2024/0091934 | A1 | * | 3/2024 | Ju .......................... B25J 13/089 |

FOREIGN PATENT DOCUMENTS

| | | |
|---|---|---|
| CN | 100608427 A | 10/2018 |
| CN | 110977974 A | 4/2020 |

OTHER PUBLICATIONS

Yoshikawa, T., "Manipulability and redundancy control of robotic mechanisms", Mar. 1985, IEEE, 1985 IEEE International Conference on Robotics and Automation, pp. 1004-1009 (Year: 1985).*
Park, T., Yang, H., "A Study on Singularity Avoidance and Robust Control of Redundant Robot", Jun. 2002, IEEE, Proceedings of the 4th World Congress on Intelligent Control and Automation (Cat. No. 02EX527), pp. 1687-1691 (Year: 2002).*

(Continued)

*Primary Examiner* — Abby Lin
*Assistant Examiner* — Karston G. Evans

(57)　　　　　　　ABSTRACT

A method for avoiding singularities of a robotic arm includes: calculating a virtual environment external force required by the robotic arm to avoid singularities based on current joint positions of joints on the robotic arm when it is determined that the robotic arm needs to avoid singularities; obtaining a current end force of the robotic arm and a desired end trajectory of the robotic arm; performing admittance control calculation based on the virtual environment external force, the current end force and the desired end trajectory to obtain a corrected end trajectory of the robotic arm; and controlling the robotic arm to move based on the corrected end trajectory.

20 Claims, 8 Drawing Sheets

```
                                              ┌─S101
┌──────────────────────────────────────────────┐
│   Calculate a virtual environment external force required by the │
│      robotic arm to avoid singularities based on current joint   │
│   positions of joints on the robotic arm when it is determined that │
│           the robotic arm needs to avoid singularities           │
└──────────────────────────────────────────────┘
                        │                     ┌─S102
                        ▼
┌──────────────────────────────────────────────┐
│  Obtain a current end force of the robotic arm and a desired end  │
│              trajectory of the robotic arm                       │
└──────────────────────────────────────────────┘
                        │                     ┌─S103
                        ▼
┌──────────────────────────────────────────────┐
│    Perform admittance control calculation based on the virtual    │
│ environment external force, the current end force and the desired │
│ end trajectory to obtain a corrected end trajectory of the robotic│
│                            arm                                   │
└──────────────────────────────────────────────┘
                        │                     ┌─S104
                        ▼
┌──────────────────────────────────────────────┐
│   Control the robotic arm to move based on the corrected end     │
│                         trajectory                               │
└──────────────────────────────────────────────┘
```

(56)     References Cited

OTHER PUBLICATIONS

Dimeas, F., et al., "Manipulator Performance Constraints in Cartesian Admittance Control for Human-Robot Cooperation", May 2016, IEEE, 2016 IEEE International Conference on Robotics and Automation (ICRA), pp. 3049-3054 (Year: 2016).*

Chan, S.K., Lawrence, P.D., "General inverse kinematics with the error damped pseudoinverse", Apr. 1988, IEEE, 1988 IEEE International Conference on Robotics and Automation, vol. 2, pp. 834-839 (Year: 1988).*

Maric, F., et al., "Manipulability Maximization Using Continuous-Time Gaussian Processes", Sep. 2018, arXiv, Proceedings of the IEEE/RSJ International Conference on Intelligent Robots and Systems (IROS'18) Workshop Towards Robots that Exhibit Manipulation Intelligence (Year: 2018).*

* cited by examiner

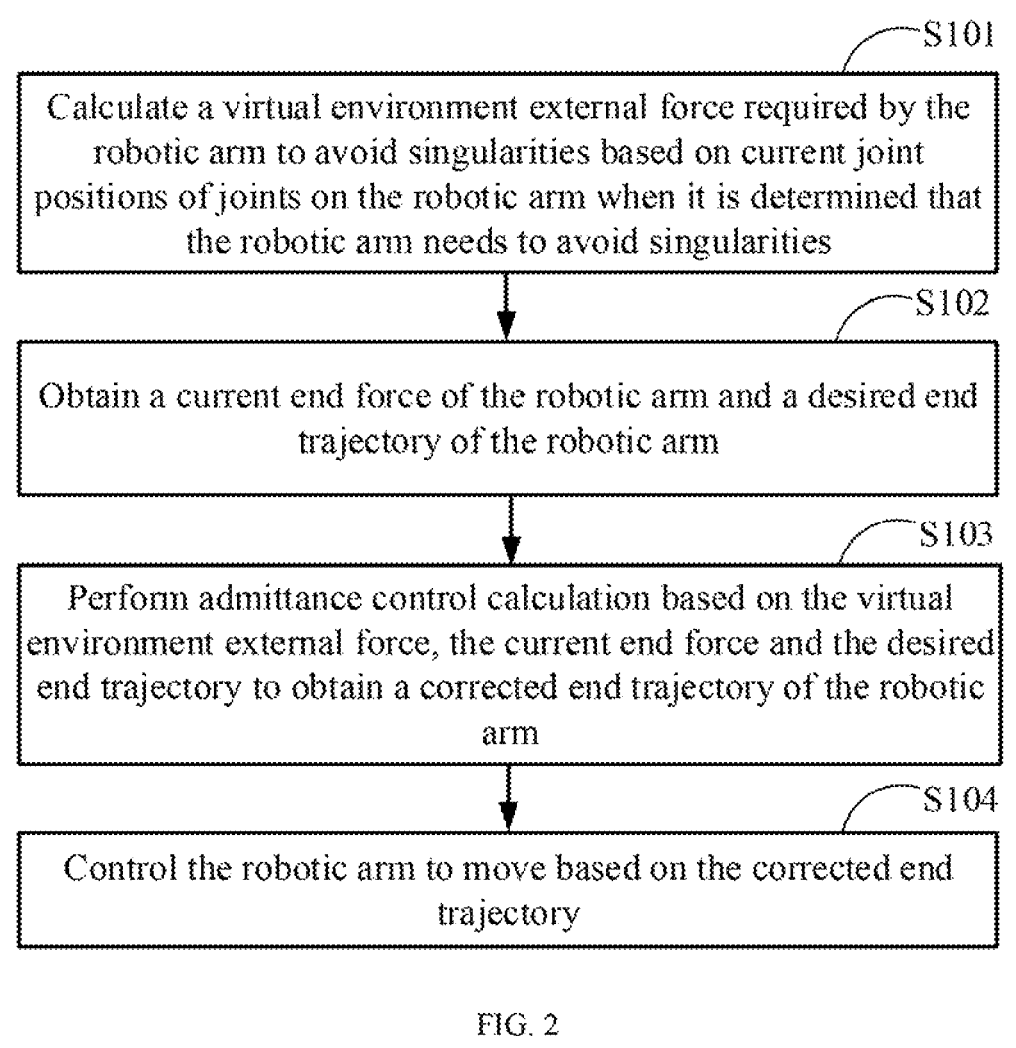

S101

Calculate a virtual environment external force required by the robotic arm to avoid singularities based on current joint positions of joints on the robotic arm when it is determined that the robotic arm needs to avoid singularities

S102

Obtain a current end force of the robotic arm and a desired end trajectory of the robotic arm

S103

Perform admittance control calculation based on the virtual environment external force, the current end force and the desired end trajectory to obtain a corrected end trajectory of the robotic arm

S104

Control the robotic arm to move based on the corrected end trajectory

FIG. 2

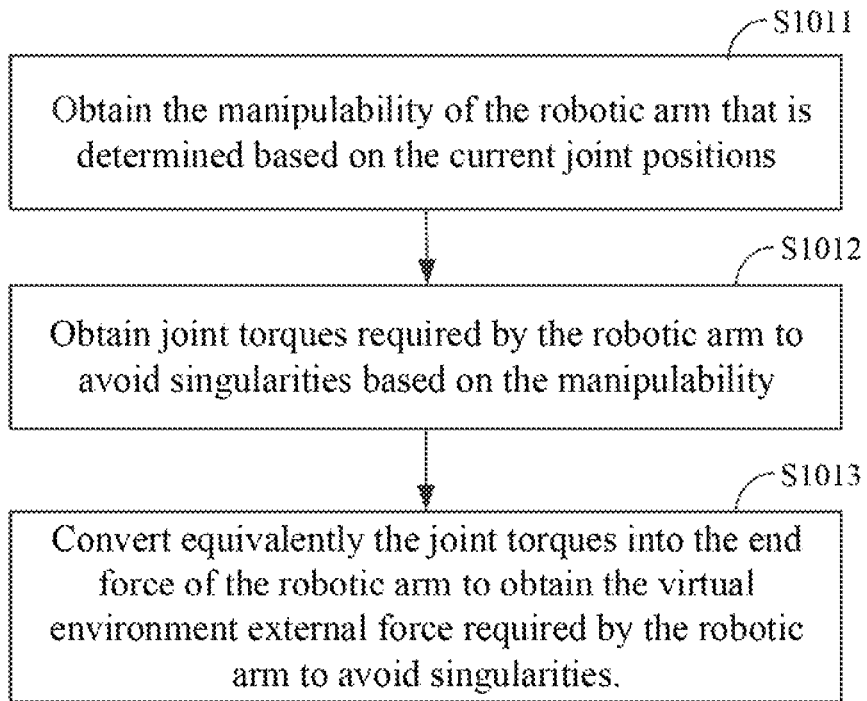

S1011

Obtain the manipulability of the robotic arm that is determined based on the current joint positions

S1012

Obtain joint torques required by the robotic arm to avoid singularities based on the manipulability

S1013

Convert equivalently the joint torques into the end force of the robotic arm to obtain the virtual environment external force required by the robotic arm to avoid singularities.

FIG. 4

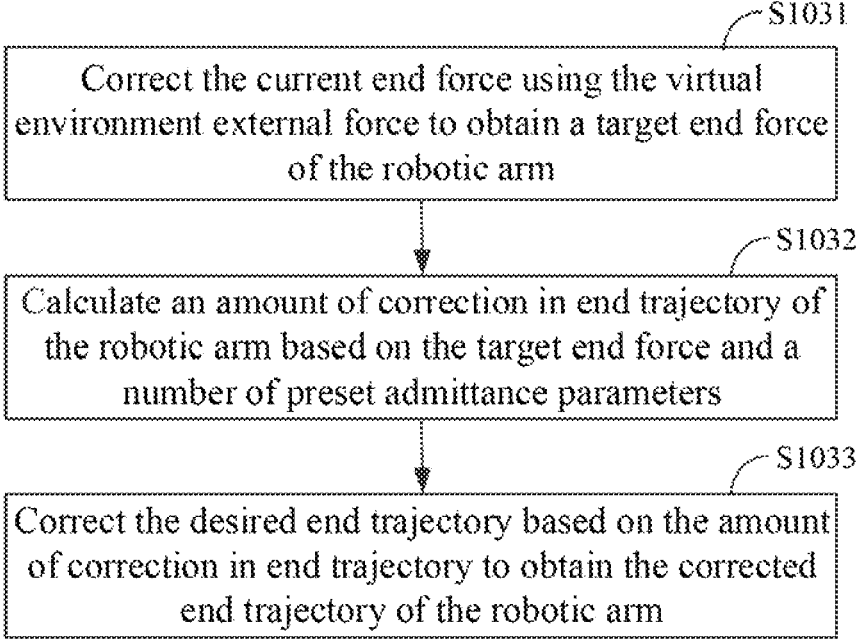

S1031

Correct the current end force using the virtual environment external force to obtain a target end force of the robotic arm

S1032

Calculate an amount of correction in end trajectory of the robotic arm based on the target end force and a number of preset admittance parameters

S1033

Correct the desired end trajectory based on the amount of correction in end trajectory to obtain the corrected end trajectory of the robotic arm

FIG. 5

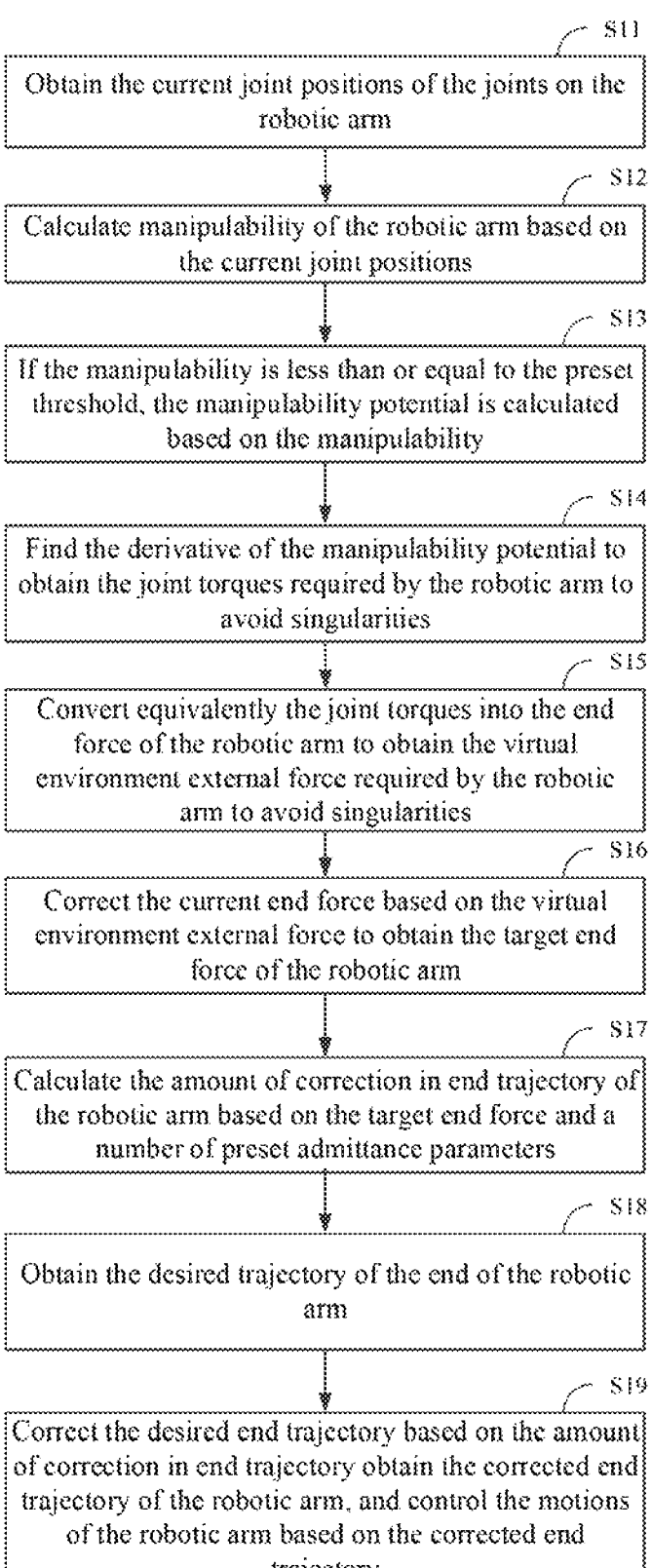

S11

Obtain the current joint positions of the joints on the robotic arm

S12

Calculate manipulability of the robotic arm based on the current joint positions

S13

If the manipulability is less than or equal to the preset threshold, the manipulability potential is calculated based on the manipulability

S14

Find the derivative of the manipulability potential to obtain the joint torques required by the robotic arm to avoid singularities

S15

Convert equivalently the joint torques into the end force of the robotic arm to obtain the virtual environment external force required by the robotic arm to avoid singularities

S16

Correct the current end force based on the virtual environment external force to obtain the target end force of the robotic arm

S17

Calculate the amount of correction in end trajectory of the robotic arm based on the target end force and a number of preset admittance parameters

S18

Obtain the desired trajectory of the end of the robotic arm

S19

Correct the desired end trajectory based on the amount of correction in end trajectory obtain the corrected end trajectory of the robotic arm, and control the motions of the robotic arm based on the corrected end trajectory

FIG. 6

METHOD FOR AVOIDING SINGULARITIES OF ROBOTIC ARM, CONTROL DEVICE AND COMPUTER-READABLE STORAGE MEDIUM

CROSS REFERENCE TO RELATED APPLICATIONS

This application claims priority to Chinese Patent Application No. CN 202211712996.X, filed Dec. 29, 2022, which is hereby incorporated by reference herein as if set forth in its entirety

TECHNICAL FIELD

The present disclosure generally relates to robots, and in particular relates to a method for avoiding singularities of a robotic arm, control device and computer-readable storage medium.

BACKGROUND

With the advancement of technology, robotic arms are increasingly assisting humans in work and daily life as collaborative or service robots. Due to the limitations of their structure, robotic arms may encounter singular configurations during operation, leading to a loss of certain degrees of freedom and affecting their motion performance. Therefore, how robotic arms can avoid singular configurations during motion has remained a focal point of research.

Conventionally, when robotic arms approach singular configurations, a common approach involves restricting joint movements to prevent the arm from getting closer to these singularities. However, this method not only affects the motion of robotic arms but also causes positional discontinuities when the arms resume movement, resulting in poor smoothness of the motion of the robotic arms.

Therefore, there is a need to provide a method for avoiding singularities to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 2 is an exemplary flowchart of a method for avoiding singularities of a robotic arm according to one embodiment.

FIG. 4 is a schematic flowchart of a method for determining a virtual environment external force required to avoid singularities.

FIG. 5 is a schematic flowchart of a method for determining a corrected end trajectory according to one embodiment.

FIG. 6 is a schematic flowchart of a method for avoiding singularities of a robotic arm according to one embodiment.

DETAILED DESCRIPTION

Figure 1:
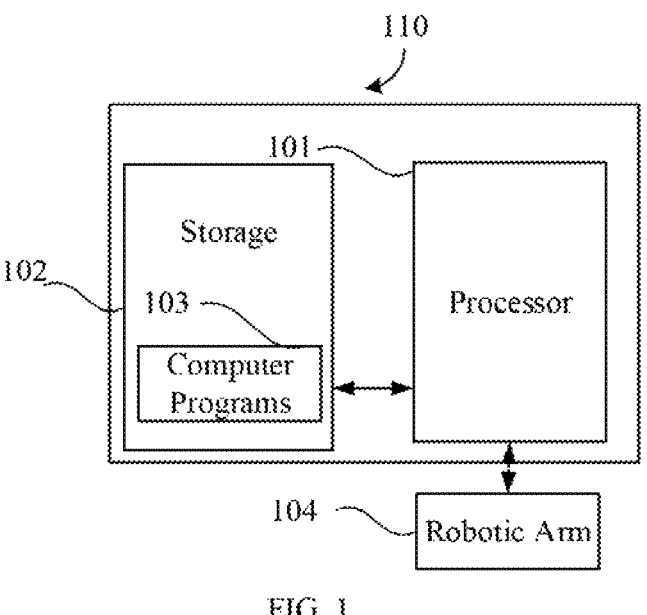
FIG. 1 is a schematic block diagram of a control device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Conventionally, the compliance of robotic arms is primarily enhanced through admittance control. Admittance control takes force as input and produces position as output. However, admittance control lacks the capability to actively avoid singular configurations in robotic arms. Especially in scenarios where robotic arms interact with human forces, they are more prone to encountering singular configurations, posing safety risks. Therefore, it's crucial to incorporate singularity avoidance measures within admittance control when dealing with interactions involving human-robot forces.

At present, when robotic arms approach singular configurations, they often restrict partial or all joint movements to prevent the arm from further getting closer to these singularities. However, limiting joint movements can lead to positional discontinuities when the joints resume movement, resulting in poor smoothness of the motion of the robotic arms. Additionally, this method requires significant computational time to identify the joints where singularities occur, impacting real-time control performance. Moreover, during the singularity avoidance process, if force interaction occurs (i.e., external force acts on the robot arm), it can cause deviations in the arm's motion. Therefore, integrating admittance control during singularity avoidance can enhance joint movements' smoothness, reduce computational load, and improve real-time control performance.

Based on the aforementioned reasons, the present disclosure proposes a singularity avoidance method for robotic arms. This method involves integrating admittance control during the singularity avoidance process, aiming to enhance the smoothness of the arm's motion and response speed.

Specifically, the method proposed by the present disclosure utilizes the manipulability of the robotic arm as a criterion to assess its proximity to singular configurations. The manipulability serves as an indicator to determine whether the robotic arm requires singularity avoidance measures.

When the robotic arm needs to avoid singularities, the manipulability is converted to obtain the joint torques. According to the conversion relationship between joint torques and end output force, the joint torques are introduced into the end external force of admittance control to achieve the integration of singularity avoidance and admittance control, thereby controlling joint motion. The method avoids singular configurations from the source of interaction, so that the robot arm can minimize positional deviations even when external forces act on the robotic arm during singularity avoidance. This approach is applicable to position control, force control, redundant or non-redundant robotic arms, offering a broad spectrum of applications.

FIG. 1 shows a schematic block diagram of a control device 110 according to one embodiment. The control device 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a method for avoiding singularities of a robotic arm, such as steps S101 to S104 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure. In one embodiment, the processor 101 may be arranged in a robot and electrically connected to a robotic arm 104. In another embodiment, the control device 110 may be part of the robotic arm 104. In another embodiment, the control device 110 may be a computer, tablet computer, laptop, netbook computer, or personal digital assistant (PDA).

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the control device 110, such as a hard disk or a memory. The storage 102 may also be an external storage device of the control device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the control device 110. The storage 102 can also be used to temporarily store data that have been output or is about to be output.

Figure 8:
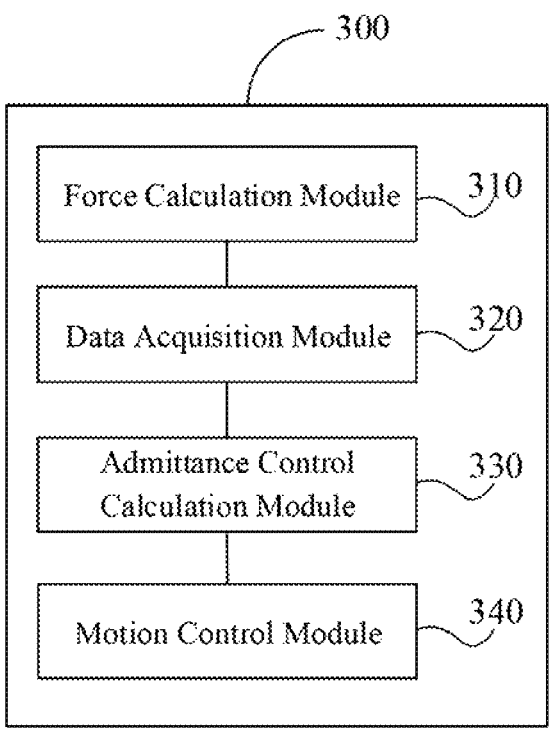
FIG. 8 is a schematic block diagram of a singularity avoiding device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the control device 110. For example, the one or more computer programs 103 may be divided into a force calculation module 310, a data acquisition module 320, an admittance control calculation module 330 and a motion control module 340 as shown in FIG. 8.

It should be noted that the block diagram shown in FIG. 1 is only an example of the control device 110. The control device 110 may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a method for avoiding singularities of a robotic arm according to one embodiment. As an example, but not a limitation, the method can be implemented by the control device 110. The method may include the following steps.

Step S101: Calculate a virtual environment external force required by the robotic arm to avoid singularities based on current joint positions of joints on the robotic arm when it is determined that the robotic arm needs to avoid singularities.

In one embodiment, the determination of whether the robotic arm needs singularity avoidance is primarily based on the extent to which the robotic arm approaches singular configurations. In one embodiment, the manipulability of the robotic arm is used to represent the extent to which the robotic arm approaches a singular configuration. Manipulability is determined based on the current joint position of each joint.

In this embodiment, the virtual environment external force required by the robot arm to avoid singularities represents the additional force required by the end of the robot arm to avoid singularities.

Figure 3:
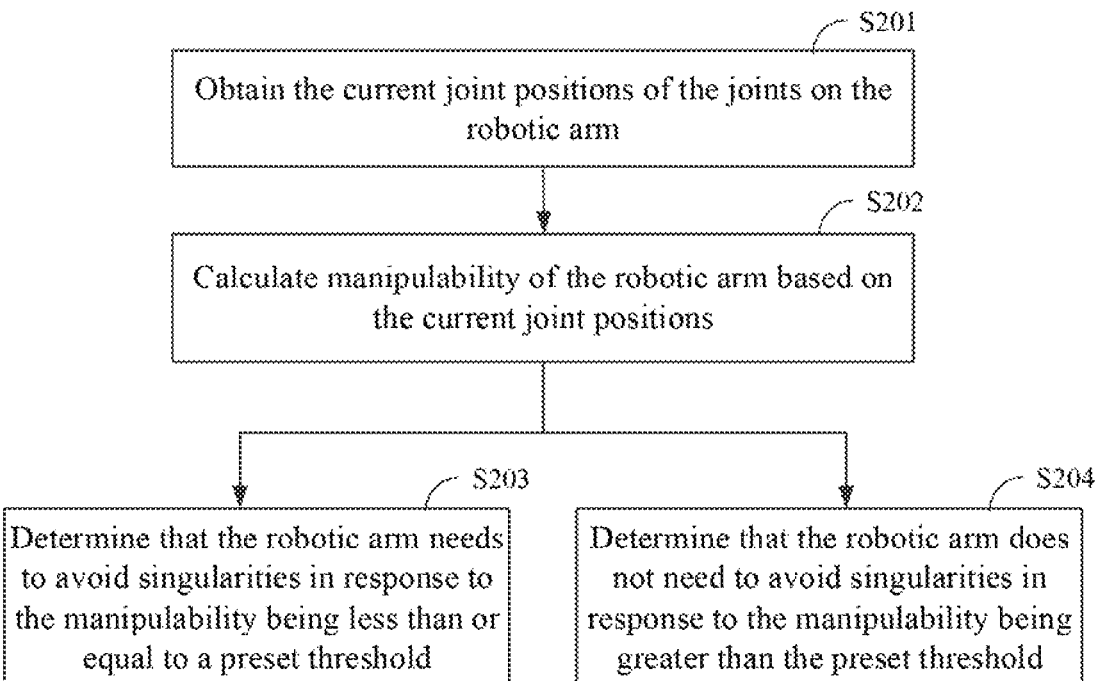
FIG. 3 is a schematic flowchart of a method for determining whether singularities need to be avoided according to one embodiment.

As shown in FIG. 3, in one embodiment, the method for determining whether the robot arm needs to avoid singularities may include the following steps.

Step S201: Obtain the current joint positions of the joints on the robotic arm.

In one embodiment, the current joint positions of the joints can be obtained from the joint sensors on the robot arm. For example, when a joint sensor measures a rotation angle of a joint, the current joint position can be represented by the rotation angle of the joint.

Step S202: Calculate manipulability of the robotic arm based on the current joint positions.

A larger manipulability indicates that the robot arm is farther away from singular configurations, and a smaller manipulability indicates that the robot arm is closer to singular configurations.

The manipulability of the robotic arm can be calculated based on a first model. The first model is expressed as follows: $m(q_{sensor}) = \sqrt{\det[J(q_{sensor})(q_{sensor})^T]}$, where $m(q_{sensor})$ represents the manipulability of the robotic arm, $q_{sensor}$ is a position vector composed of the current joint positions, $J(q_{sensor})$ is a Jacobian matrix about $q_{sensor}$, $J(q_{sensor})^T$ is a transpose of $J(q_{sensor})$ $\det[J(q_{sensor})J(q_{sensor})^T]$ is a determinant of a matrix $J(q_{sensor})J(q_{sensor})^T$. The Jacobian matrix refers to the partial differential relationship between the pose of the end of the robotic arm and the current joint positions of the joints of the robotic arm. $q_{sensor} \in R^n$, n is the degree of freedom of the robotic arm, and $J(q_{sensor}) \in R^{6 \times n}$.

Step S203: Determine that the robotic arm needs to avoid singularities in response to the manipulability being less than or equal to a preset threshold.

It should be noted that the preset threshold can be adjusted according to actual needs.

Step S204: Determine that the robotic arm does not need to avoid singularities in response to the manipulability being greater than the preset threshold.

Step S102: Obtain a current end force of the robotic arm and a desired end trajectory of the robotic arm.

In one embodiment, the current end force of the robotic arm can be measured through an end sensor. The desired end trajectory of the robotic arm can be obtained from a motion planner.

The desired end trajectory can be represented by parameters such as the desired end pose, desired end velocity, and desired end acceleration.

Step S103: Perform admittance control calculation based on the virtual environment external force, the current end force and the desired end trajectory to obtain a corrected end trajectory of the robotic arm.

Specifically, the virtual environment external force and the current end force are input into an admittance controller to obtain the amount of correction in end trajectory of the robotic arm. The amount of correction in end trajectory may include the amount of correction in end pose, the amount of correction in end velocity, and the amount of correction in end acceleration.

The desired end trajectory is corrected using the amount of correction in end trajectory to obtain the corrected end trajectory of the robotic arm. The corrected end trajectory may include the corrected end pose, corrected end velocity, and corrected end acceleration.

Step S104: Control the robotic arm to move based on the corrected end trajectory.

In one embodiment, the target position of each joint is determined based on the corrected end trajectory, and the motion of the robotic arm is controlled according to the target positions.

In one embodiment, the corrected end trajectory is input to a motion controller to obtain the target position of each joint.

When the motion controller is a position control controller, the target positions are the joint position. When the motion controller is a force control controller, the target positions are joint torques.

In summary, when the robotic arm needs to avoid singularities, the calculation of required virtual environmental external force is based on the current joint positions of the joints on the robotic arm. Based on the virtual environment external force, the current end force of the robotic arm and the desired trajectory of the end of the robotic arm, the admittance control calculation is performed to obtain the corrected trajectory of the end of the robotic arm. The motion of the robotic arm is then controlled based on the corrected end trajectory. Due to the compliance control's ability to smoothen the motion of the robotic arm, the method proposed by the present disclosure integrates singularity avoidance into the compliance control by incorporating calculated virtual environmental forces. This ensures that the robotic arm avoids discontinuities or stiffness of the motions of the joints during singularity avoidance, enhancing the overall smoothness of the arm's motions.

Referring to FIG. 4, in one embodiment, step S101 may include the following steps.

Step S1011: Obtain the manipulability of the robotic arm that is determined based on the current joint positions.

In one embodiment, the manipulability can be determined according to the aforementioned step S202. Please refer to the aforementioned step S202 for details, which will not be repeated here.

Step S1012: Obtain joint torques required by the robotic arm to avoid singularities based on the manipulability.

In one embodiment, the manipulability can be used to compute the manipulability potential. The derivative of the manipulability potential is calculated to determine the joint torques required for singularity avoidance by the robotic arm. The manipulability potential is utilized to represent the energy needed for the robotic arm to avoid singularities.

In one embodiment, the manipulability potential is expressed as follows:

$$V_m(q_{sensor}) = \begin{cases} k_{SA}[m(q_{sensor}) - m_0]^2 & ; m(q_{sensor}) \leq m_0 \\ 0 & ; m(q_{sensor}) > m_0 \end{cases},$$

where $V_m(q_{sensor})$ represents the manipulability potential, $k_{SA}$ represents the preset tuning gain, $m_0$ is the predetermined manipulability threshold, $m(q_{sensor})$ is the manipulability.

The joint torques are expressed as follows:

$$\tau_{SA} = \frac{\partial V_m(q_{sensor})}{\partial q_{sensor}} 2 \times k_{SA}[m_0 - m(q_{sensor})] \times J_m(q_{sensor})^T,$$

where $\tau_{SA}$ represent the joint torques, $k_{SA}$ is a preset adjustment gain, $J_m(q_{sensor})^T$ is a transpose of $J_m(q_{sensor})$. $J_m(q_{sensor})$ is an manipulability Jacobian matrix that represents a partial differential relationship between the manipulability and the current joint positions, $J_m(q_{sensor}) \in R^n$.

The derivation method for $J_m(q_{sensor})$ includes:

$$J_{m,i}(q_{sensor}) = \frac{\partial m(q_{sensor})}{\partial q_i} = \frac{\partial \sqrt{\det[J(q_{sensor})](q_{sensor})^T]}}{\partial q_i},$$

i=1, 2, . . . , n. $J_m(q_{sensor})=[J_{m,i}(q_{sensor}) \ldots J_{m,n}(q_{sensor})]$, $q_i$ represents the current joint position of the i-th joint.

The derivation process of the determinant is as follows:

$$\frac{\partial \det[A(x)]}{\partial x} = \text{trace}\left[\frac{\partial A}{\partial x} adj(A)\right] = \det(A) \times \text{trace}\left(\frac{\partial A}{\partial x} A^{-1}\right),$$

where trace(A) represents the trace of matrix A, trace(kA)= k×trace(A), adj(A) represents the adjoint matrix of matrix A. and adj(A)=det (A)×A$^{-1}$.

From the derivation process of the aforementioned determinant, the following equation can be obtained:

$$J_{m,i} = \frac{1}{2\sqrt{\det(JJ^T)}} \times \frac{\partial \det(JJ^T)}{\partial q_i} =$$

$$\frac{\sqrt{\det(JJ^T)}}{2} \times \text{trace}\left[\frac{\partial JJ^T}{\partial q_i}(JJ^T)^{-1}\right] = \frac{m(q_{sensor})}{2} \times \text{trace}\left[\frac{\partial JJ^T}{\partial q_i}(JJ^T)^{-1}\right] =$$

$$\frac{m(q_{sensor})}{2} \times \text{trace}\left[\left(\frac{\partial J}{\partial q_i}J^T + J\frac{\partial J^T}{\partial q_i}\right)(JJ^T)^{-1}\right] =$$

$$m(q_{sensor}) \times \text{trace}\left[\frac{\partial J}{\partial q_i}J^T(JJ^T)^{-1}\right] =$$

$$m(q_{sensor}) \times \text{trace}[(H_iJ^T(JJ^T)^{-1}] = m(q_{sensor}) \times vec(JH_i^T)^T vec((JJ^T)^{-1}),$$

where $J_{m,i}$ represents $J_{m,i}(q_{sensor})$, $JJ^T$ represents $[J(q_{sensor})J(q_{sensor})^T]$, J represents $J(q_{sensor})$, $J^T$ represents $J(q_{sensor})^T$. The operator vec is used to denote the transformation of a matrix into a vector. trace(A+B)=trace(A)+trace(B), trace (AB)=trace(BA), $$H_i = \frac{\partial J}{\partial q_i},$$

which represents the i-th item of the Hessian matrix $H \in_i^{6 \times n \times n}$. $H_i^T$ is the transpose of $H_i$.

Step S1013: Convert equivalently the joint torques into the end force of the robotic arm to obtain the virtual environment external force required by the robotic arm to avoid singularities.

In one embodiment, the virtual environment external force may be calculated based on the second model. The second model is expressed as follows: $F_{SA} = J(q_{sensor})^{+T} \tau_{SA}$, $F_{SA}$ is the virtual environment external force, the virtual environment external force is expressed as follows: $F_{SA} = J(q_{sensor})^{+T} \tau_{SA}$, where $F_{SA}$ is the virtual environment external force, $J(q_{sensor})^{+T}$ is a pseudo-inverse matrix of $J(q_{sensor})^T$. To reduce computational time, $J(q_{sensor})^{+T}$ can be replaced by $J(q_{sensor})$.

Specifically, $$F_{SA} = 2 \times k_{SA}[m_0 - m(q_{sensor})] \times J \ ( \ q_{sensor} \ )^{+T} J_m(q_{sensor})^T.$$

Referring to FIG. 5, in one embodiment, step S103 may include the following steps.

Step S1031: Correct the current end force using the virtual environment external force to obtain a target end force of the robotic arm.

The virtual environmental external force is added to the current end force to obtain the target end force.

Step S1032: Calculate an amount of correction in end trajectory of the robotic arm based on the target end force and a number of preset admittance parameters.

In one embodiment, the admittance parameters can include an inertia matrix, damping matrix, and stiffness matrix.

Specifically, the principles of admittance control involve:

$$M(\ddot{x}_{com} - \ddot{x}_{ref}) + B(\dot{x}_{com} - \dot{x}_{ref}) + K(x_{com} - x_{ref}) = F_{sensor} + F_{SA};$$

$$\ddot{e}(t) = M^{-1}\left(F_{sensor} + F_{SA} - B\int_0^{t-1}\ddot{e} - K\int\int_0^{t-1}\ddot{e}\right);$$

where $x_{ref}$ is the desired end pose, $\dot{x}_{ref}$ is the desired end velocity, and $\ddot{x}_{ref}$ is the desired end acceleration, $x_{com}$ is the corrected end pose, $\dot{x}_{com}$ is the corrected end velocity, and $\ddot{x}_{com}$ is the desired end acceleration, M is a preset inertia matrix, B is a preset damping matrix, and K is a stiffness matrix, $F_{sensor}$ represents the current end force, $F_{SA}$ represents the virtual environment external force. The amount of correction in end trajectory includes $\ddot{e}(t)$, $\dot{e}(t)$ and $e(t)$. $\ddot{e}(t)$ is the amount of correction in end pose, $\dot{e}(t)$ is the amount of correction in end velocity, and $e(t)$ is the amount of correction in end acceleration.

$$\ddot{e}(t) = \ddot{x}_{com} - \ddot{x}_{ref}, \dot{e}(t) = \dot{x}_{com} - \dot{x}_{ref}, \text{ and } e(t) = x_{com} - x_{ref}.$$

After $\ddot{e}(t)$ is calculated according to the aforementioned equations, $\dot{e}(t)$ and $e(t)$ can be obtained based on $\ddot{e}(t)$.

Step S1033: Correct the desired end trajectory based on the amount of correction in end trajectory to obtain the corrected end trajectory of the robotic arm.

Specifically, the amount of correction in end trajectory is added to the desired end trajectory to obtain the corrected end trajectory. The amount of correction in end pose is added to the desired end pose to obtain the corrected end pose. The amount of correction in end velocity is added to the desired end velocity to obtain the corrected end velocity. The amount of correction in end acceleration is added to the desired end acceleration is added to obtain the corrected end acceleration.

Referring to FIG. 5, in one embodiment the method may further include the following steps.

Step S1: Obtain the current joint positions of the joints on the robotic arm.

Step S12: Calculate manipulability of the robotic arm based on the current joint positions.

The method of calculating the manipulability is the same as the step S202 above, and will not be described again here.

Step S13: If the manipulability is less than or equal to the preset threshold, the manipulability potential is calculated based on the manipulability.

Specifically, the method of calculating the manipulability potential is the same as the step S1012 above, and will not be described again here.

Step S14: Find the derivative of the manipulability potential to obtain the joint torques required by the robotic arm to avoid singularities.

Specifically, the method of calculating the joint torques is the same as the above-mentioned step S1012, and will not be described again here.

Step S15: Convert equivalently the joint torques into the end force of the robotic arm to obtain the virtual environment external force required by the robotic arm to avoid singularities.

Specifically, the method of calculating the virtual environment external force is the same as the above-mentioned step S1013, and will not be described again here.

Step S16: Correct the current end force based on the virtual environment external force to obtain the target end force of the robotic arm.

Step S17: Calculate the amount of correction in end trajectory of the robotic arm based on the target end force and a number of preset admittance parameters.

Specifically, the method of calculating the amount of correction in end trajectory the same as the above-mentioned step S1032, and will not be described again here.

Step S18: Obtain the desired trajectory of the end of the robotic arm.

Step S19: Correct the desired end trajectory based on the amount of correction in end trajectory obtain the corrected end trajectory of the robotic arm, and control the motions of the robotic arm based on the corrected end trajectory.

Figure 7:
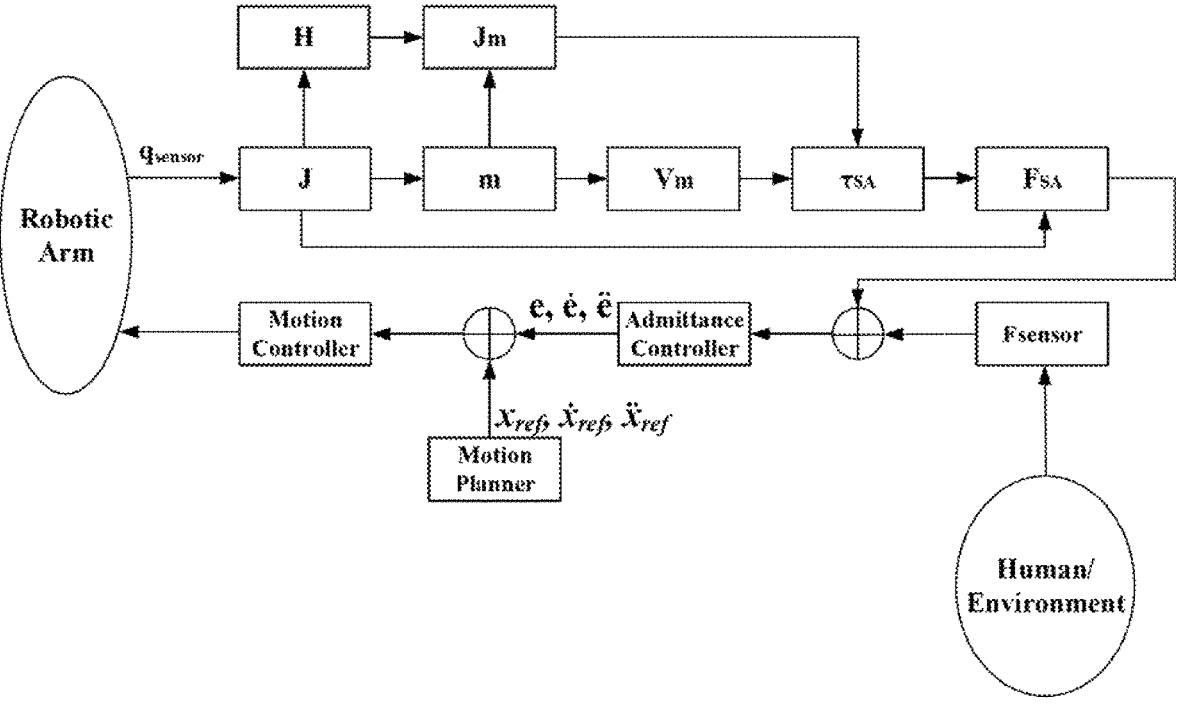
FIG. 7 is a schematic diagram showing the principle of the avoidance of singularities for a robotic arm according to one embodiment.

Referring to FIG. 7, in one embodiment, J in the figure is the aforementioned $J(q_{sensor})$, m is the aforementioned $m(q_{sensor})$, $J_m$ is the aforementioned $J_m(q_{sensor})$, $V_m$ is the aforementioned $V_m(q_{sensor})$, e is the aforementioned $e(t)$, $\dot{e}$ is the aforementioned $\dot{e}(t)$, $\ddot{e}$ is the aforementioned $\ddot{e}(t)$.

In one embodiment, the method may further include the following steps.

Step 1: Obtain the current joint position $q_{sensor}$ of each joint of the robotic arm.

Step 2: Calculate the Jacobian matrix J of the current joint positions $q_{sensor}$.

Step 3: Calculate the manipulability m and Hessian matrix H based on the current joint positions $q_{sensor}$.

Step 4: When the manipulability is less than or equal to the preset threshold, calculate the manipulability potential $V_m$ based on the manipulability m.

The calculation method of the manipulability is the same as the above-mentioned step S202, and will not be described again here. The calculation method of manipulability potential is the same as the above-mentioned step S1012, and will not be described again here.

Step 5: Calculate the manipulability Jacobian matrix $J_m$ based on the Hessian matrix H. The calculation method of the manipulability Jacobian matrix is the same as the above-mentioned step S1012, and will not be described again here.

Step 6: Calculate the joint torques $\tau_{SA}$ required by the mechanical arm to avoid singularities based on the manipulability Jacobian matrix $J_m$ and the manipulability potential $V_m$.

The calculation method of the joint torques $\tau_{SA}$ is the same as the above-mentioned step S1012, and will not be described again here.

Step 7: Convert equivalently the joint torques $\tau_{SA}$ into the force at the end of the robotic arm based on the Jacobian matrix J to obtain the virtual environment external force $F_{SA}$ required by the robotic arm to avoid singularities.

The calculation method of the virtual environment external force $F_{SA}$ is the same as the above-mentioned step S1013, and will not be described again here.

Step 8: Obtain the current end force of the robotic arm and input the virtual environment external force $F_{SA}$ and the current end force to the admittance controller to obtain the amount of correction in end trajectory e, ė and ë of the robotic arm.

Step 9: Obtain the desired end trajectory $x_{ref}$, $\dot{x}_{ref}$ and $\ddot{x}_{ref}$ of the robotic arm from the motion planner, where $x_{ref}$ is the desired end pose, $\dot{x}_{ref}$ is the desired end velocity, and $\ddot{x}_{ref}$ is the desired end acceleration.

Step 10: Input the amount of correction in end trajectory e, ė and ë, and the desired end trajectory $x_{ref}$, $\dot{x}_{ref}$ and $\ddot{x}_{ref}$ to the motion controller to obtain the joint positions $q_{com}$ or $\tau_{com}$, and control the motions of the robotic arm according to the joint positions. $q_{com}$ is the joint positions and $\tau_{com}$ is the joint torques.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Referring to FIG. 8, in one embodiment, a singularity avoiding device 300 may include a force calculation module 310, a data acquisition module 320, an admittance control calculation module 330 and a motion control module 340.

The force calculation module 310 is to calculate a virtual environment external force required by the robotic arm to avoid singularities based on current joint positions of joints on the robotic arm when it is determined that the robotic arm needs to avoid singularities. The data acquisition module 320 is to obtain a current end force of the robotic arm and a desired end trajectory of the robotic arm. The admittance control calculation module 330 is to perform admittance control calculation based on the virtual environment external force, the current end force and the desired end trajectory to obtain a corrected end trajectory of the robotic arm. The motion control module 340 is to control the robotic arm to move based on the corrected end trajectory.

In one embodiment, the singularity avoiding device 300 may further include a joint position acquisition module, a manipulability calculation module and a singularity avoidance determining module that are coupled to the force calculation module 310. The joint position acquisition module is to obtain the current joint positions of the joints on the robotic arm. The manipulability calculation module is to calculate manipulability of the robotic arm based on the current joint positions. The singularity avoidance determining module is to determine that the robotic arm needs to avoid singularities in response to the manipulability being less than or equal to a preset threshold.

In one embodiment, the singularity avoidance determining module is to determine that the robotic arm does not need to avoid singularities in response to the manipulability being greater than the preset threshold.

In one embodiment, the manipulability calculation module is further to calculate the manipulability of the robotic arm according to a first model. The first model is expressed as follows: $m(q_{sensor})=\sqrt{\det[J(q_{sensor})J(q_{sensor})^T]}$, where $m(q_{sensor})$ represents the manipulability of the robotic arm, $q_{sensor}$ is a position vector composed of the current joint positions, $J(q_{sensor})$ is a Jacobian matrix about $q_{sensor}$, $J(q_{sensor})^T$ is a transpose of $J(q_{sensor})$, $\det[J(q_{sensor})J(q_{sensor})^T]$ is a determinant of a matrix $J(q_{sensor})J(q_{sensor})^T$. The virtual environment external force is expressed as follows: $F_{SA}=J(q_{sensor})^{+T}\tau_{SA}$, where $F_{SA}$ is the virtual environment external force, $J(q_{sensor})+^T$ is a pseudo-inverse matrix of $J(q_{sensor})^T$.

In one embodiment, the force calculation module 310 is further to: obtain the manipulability of the robotic arm, wherein the manipulability is determined based on the current joint positions; obtain joint torques required by the robotic arm to avoid singularities based on the manipulability; and convert equivalently the joint torques into the end force of the robotic arm to obtain the virtual environment external force required by the robotic arm to avoid singularities.

In one embodiment, the joint torques are expressed as follows: $\tau_{SA}=2\times k_{SA}[m_0-m(q_{sensor})]\times J_m(q_{sensor})^T$, where $\tau_{SA}$ represent the joint torques, $k_{SA}$ is a preset adjustment gain, $m_0$ is a preset manipulability threshold, $m(q_{sensor})$ is the manipulability, $J_m(q_{sensor})^T$ is a transpose of $J_m(q_{sensor})$, $J_m(q_{sensor})$ is an manipulability Jacobian matrix that represents a partial differential relationship between the manipulability and the current joint positions In one embodiment, the motion control module 340 is further to: correct the current end force using the virtual environment external force to obtain a target end force of the robotic arm; calculate an amount of correction in end trajectory of the robotic arm based on the target end force and a preset admittance parameter; and correct the desired end trajectory based on the amount of correction in end trajectory to obtain the corrected end trajectory of the robotic arm.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for avoiding singularities of a robotic arm, the method comprising:

calculating a virtual environment external force required by the robotic arm to avoid singularities based on current joint positions of joints on the robotic arm when it is determined that the robotic arm needs to avoid singularities;

obtaining a current end force of the robotic arm and a desired end trajectory of the robotic arm;

performing admittance control calculation based on the virtual environment external force, the current end force and the desired end trajectory to obtain a corrected end trajectory of the robotic arm; and controlling the robotic arm to move based on the corrected end trajectory;

wherein the method further comprises:

obtaining the current joint positions of the joints on the robotic arm;

calculating manipulability of the robotic arm based on the current joint positions; and determining that the robotic arm needs to avoid singularities in response to the manipulability being less than or equal to a preset threshold; and wherein calculating the virtual environment external force required by the robotic arm to avoid singularities based on current joint positions of joints on the robotic arm comprises:

obtaining the manipulability of the robotic arm, wherein the manipulability is determined based on the current joint positions;

obtaining joint torques required by the robotic arm to avoid singularities based on the manipulability; and converting equivalently the joint torques into the end force of the robotic arm to obtain the virtual environment external force required by the robotic arm to avoid singularities.

2. The method of claim 1, further comprising, after calculating manipulability of the robotic arm based on the current joint positions, determining that the robotic arm does not need to avoid singularities in response to the manipulability being greater than the preset threshold.

3. The method of claim 1, wherein calculating manipulability of the robotic arm based on the current joint positions comprises:

calculating the manipulability of the robotic arm according to a first model, wherein the first model is expressed as follows: $m(q_{sensor})=\sqrt{\det[J(q_{sensor})J(q_{sensor})^T]}$, where $m(q_{sensor})$ represents the manipulability of the robotic arm, $q_{sensor}$ is a position vector composed of the current joint positions, $J(q_{sensor})$ is a Jacobian matrix about $q_{sensor}$, $J(q_{sensor})^T$ is a transpose of $J(q_{sensor})$, det $[J(q_{sensor})J(q_{sensor})^T]$ is a determinant of a matrix $J(q_{sensor})J(q_{sensor})^T$.

4. The method of claim 1, wherein the joint torques are expressed as follows: $\tau_{SA}=2\times k_{SA}[m_0-m(q_{sensor})]\times J_m(q_{sensor})^T$, where $\tau_{SA}$ represent the joint torques, $k_{SA}$ is a preset adjustment gain, $m_0$ is a preset manipulability threshold, $m(q_{sensor})$ is the manipulability, $J_m(q_{sensor})^T$ is a transpose of $J_m(q_{sensor})$, $J_m(q_{sensor})$ is an manipulability Jacobian matrix that represents a partial differential relationship between the manipulability and the current joint positions; the virtual environment external force is expressed as follows: $F_{SA}=J(q_{sensor})^{+T}\tau_{SA}$, where $F_{SA}$ is the virtual environment external force, $J(q_{sensor})^{+T}$ is a pseudo-inverse matrix of $J(q_{sensor})^T$.

5. The method of claim 1, wherein performing admittance control calculation based on the virtual environment external force, the current end force and the desired end trajectory to obtain the corrected end trajectory of the robotic arm comprises:

correcting the current end force using the virtual environment external force to obtain a target end force of the robotic arm;

calculating an amount of correction in end trajectory of the robotic arm based on the target end force and a preset admittance parameter; and correcting the desired end trajectory based on the amount of correction in end trajectory to obtain the corrected end trajectory of the robotic arm.

6. A control device comprising:

one or more processors; and a memory coupled to the one or more processors, the memory storing programs that, when executed by the one or more processors, cause performance of operations comprising:

calculating a virtual environment external force required by a robotic arm to avoid singularities based on current joint positions of joints on the robotic arm when it is determined that the robotic arm needs to avoid singularities;

obtaining a current end force of the robotic arm and a desired end trajectory of the robotic arm;

performing admittance control calculation based on the virtual environment external force, the current end force and the desired end trajectory to obtain a corrected end trajectory of the robotic arm; and controlling the robotic arm to move based on the corrected end trajectory;

wherein the operations further comprise:

obtaining the current joint positions of the joints on the robotic arm;

calculating manipulability of the robotic arm based on the current joint positions; and determining that the robotic arm needs to avoid singularities in response to the manipulability being less than or equal to a preset threshold; and wherein calculating the virtual environment external force required by the robotic arm to avoid singularities based on current joint positions of joints on the robotic arm comprises:

obtaining the manipulability of the robotic arm, wherein the manipulability is determined based on the current joint positions;

obtaining joint torques required by the robotic arm to avoid singularities based on the manipulability; and converting equivalently the joint torques into the end force of the robotic arm to obtain the virtual environment external force required by the robotic arm to avoid singularities.

7. The control device of claim 6, wherein the operations further comprise, after calculating manipulability of the robotic arm based on the current joint positions, determining that the robotic arm does not need to avoid singularities in response to the manipulability being greater than the preset threshold.

8. The control device of claim 6, wherein calculating manipulability of the robotic arm based on the current joint positions comprises:

calculating the manipulability of the robotic arm according to a first model, wherein the first model is expressed as follows: $m(q_{sensor}) = \sqrt{\det[J(q_{sensor})J(q_{sensor})^T]}$, where $m(q_{sensor})$ represents the manipulability of the robotic arm, $q_{sensor}$ is a position vector composed of the current joint positions, $J(q_{sensor})$ is a Jacobian matrix about $q_{sensor}$, $J(q_{sensor})^T$ is a transpose of $J(q_{sensor})$, $\det[J(q_{sensor})J(q_{sensor})^T]$ is a determinant of a matrix $J(q_{sensor})J(q_{sensor})^T$.

9. The control device of claim 6, wherein the joint torques are expressed as follows: $\tau_{SA} = 2 \times k_{SA}[m_0 - m(q_{sensor})] \times J_m(q_{sensor})^T$, where $\tau_{SA}$ represent the joint torques, $k_{SA}$ is a preset adjustment gain, $m_0$ is a preset manipulability threshold, $m(q_{sensor})$ is the manipulability, $J_m(q_{sensor})^T$ is a transpose of $J_m(q_{sensor})$, $J_m(q_{sensor})$ is an manipulability Jacobian matrix that represents a partial differential relationship between the manipulability and the current joint positions; the virtual environment external force is expressed as follows: $F_{SA} = J(q_{sensor})^{+T}\tau_{SA}$, where $F_{SA}$ is the virtual environment external force, $J(q_{sensor})^{+T}$ is a pseudo-inverse matrix of $J(q_{sensor})^T$.

10. The control device of claim 6, wherein performing admittance control calculation based on the virtual environment external force, the current end force and the desired end trajectory to obtain the corrected end trajectory of the robotic arm comprises:

correcting the current end force using the virtual environment external force to obtain a target end force of the robotic arm;

calculating an amount of correction in end trajectory of the robotic arm based on the target end force and a preset admittance parameter; and correcting the desired end trajectory based on the amount of correction in end trajectory to obtain the corrected end trajectory of the robotic arm.

11. A non-transitory computer-readable storage medium storing instructions that, when executed by at least one processor of a control device, cause the at least one processor to perform a method, the method comprising:

calculating a virtual environment external force required by the robotic arm to avoid singularities based on current joint positions of joints on the robotic arm when it is determined that the robotic arm needs to avoid singularities;

obtaining a current end force of the robotic arm and a desired end trajectory of the robotic arm;

performing admittance control calculation based on the virtual environment external force, the current end force and the desired end trajectory to obtain a corrected end trajectory of the robotic arm; and controlling the robotic arm to move based on the corrected end trajectory;

wherein the method further comprises:

obtaining the current joint positions of the joints on the robotic arm;

calculating manipulability of the robotic arm based on the current joint positions; and determining that the robotic arm needs to avoid singularities in response to the manipulability being less than or equal to a preset threshold; and wherein calculating the virtual environment external force required by the robotic arm to avoid singularities based on current joint positions of joints on the robotic arm comprises:

obtaining the manipulability of the robotic arm, wherein the manipulability is determined based on the current joint positions;

obtaining joint torques required by the robotic arm to avoid singularities based on the manipulability; and converting equivalently the joint torques into the end force of the robotic arm to obtain the virtual environment external force required by the robotic arm to avoid singularities.

12. The non-transitory computer-readable storage medium of claim 11, wherein the method further comprises, after calculating manipulability of the robotic arm based on the current joint positions, determining that the robotic arm does not need to avoid singularities in response to the manipulability being greater than the preset threshold.

13. The non-transitory computer-readable storage medium of claim 11, wherein calculating manipulability of the robotic arm based on the current joint positions comprises:

calculating the manipulability of the robotic arm according to a first model, wherein the first model is expressed as follows: $m(q_{sensor}) = \sqrt{\det[J(q_{sensor})J(q_{sensor})^T]}$, where $m(q_{sensor})$ represents the manipulability of the robotic arm, $q_{sensor}$ is a position vector composed of the current joint positions, $J(q_{sensor})$ is a Jacobian matrix about $q_{sensor}$, $J(q_{sensor})^T$ is a transpose of $J(q_{sensor})$, $\det[J(q_{sensor})J(q_{sensor})^T]$ is a determinant of a matrix $J(q_{sensor})J(q_{sensor})^T$.

14. The non-transitory computer-readable storage medium of claim 11, wherein the joint torques are expressed as follows: $\tau_{SA} = 2 \times k_{SA}[m_0 - m(q\ sensor)] \times J_m(q_{sensor})^T$, where $\tau_{SA}$ represent the joint torques, $k_{SA}$ is a preset adjustment gain, $m_0$ is a preset manipulability threshold, $m(q_{sensor})$ is the manipulability, $J_m(q_{sensor})^T$ is a transpose of $J_m(q_{sensor})$, $J_m(q_{sensor})$ is an manipulability Jacobian matrix that represents a partial differential relationship between the manipulability and the current joint positions; the virtual environment external force is expressed as follows: $F_{SA}=J(q_{sensor})^{+T}\tau_{SA}$, where $F_{SA}$ is the virtual environment external force, $J(q_{sensor})^{+T}$ is a pseudo-inverse matrix of $J(q_{sensor})^{T}$.

15. The non-transitory computer-readable storage medium of claim 11, wherein performing admittance control calculation based on the virtual environment external force, the current end force and the desired end trajectory to obtain the corrected end trajectory of the robotic arm comprises:

correcting the current end force using the virtual environment external force to obtain a target end force of the robotic arm;

calculating an amount of correction in end trajectory of the robotic arm based on the target end force and a preset admittance parameter; and correcting the desired end trajectory based on the amount of correction in end trajectory to obtain the corrected end trajectory of the robotic arm.

16. The non-transitory computer-readable storage medium of claim 15, wherein correcting the current end force using the virtual environment external force to obtain the target end force of the robotic arm comprises:

adding the virtual environmental external force to the current end force to obtain the target end force of the robotic arm.

17. The non-transitory computer-readable storage medium of claim 15, wherein correcting the desired end trajectory based on the amount of correction in end trajectory to obtain the corrected end trajectory of the robotic arm comprises:

adding the amount of correction in end trajectory to the desired end trajectory to obtain the corrected end trajectory of the robotic arm.

18. The non-transitory computer-readable storage medium of claim 11, wherein performing the admittance control calculation based on the virtual environment external force, the current end force and the desired end trajectory to obtain the corrected end trajectory of the robotic arm comprises:

inputting the virtual environment external force and the current end force into an admittance controller to obtain an amount of correction in end trajectory of the robotic arm; and correcting the desired end trajectory using the amount of correction in end trajectory to obtain the corrected end trajectory of the robotic arm.

19. The non-transitory computer-readable storage medium of claim 18, wherein the amount of correction in end trajectory comprises: an amount of correction in end pose, an amount of correction in end velocity, and an amount of correction in end acceleration.

20. The non-transitory computer-readable storage medium of claim 19, wherein the corrected end trajectory comprises: a corrected end pose, a corrected end velocity, and a corrected end acceleration.

\* \* \* \* \*